Figure 1:
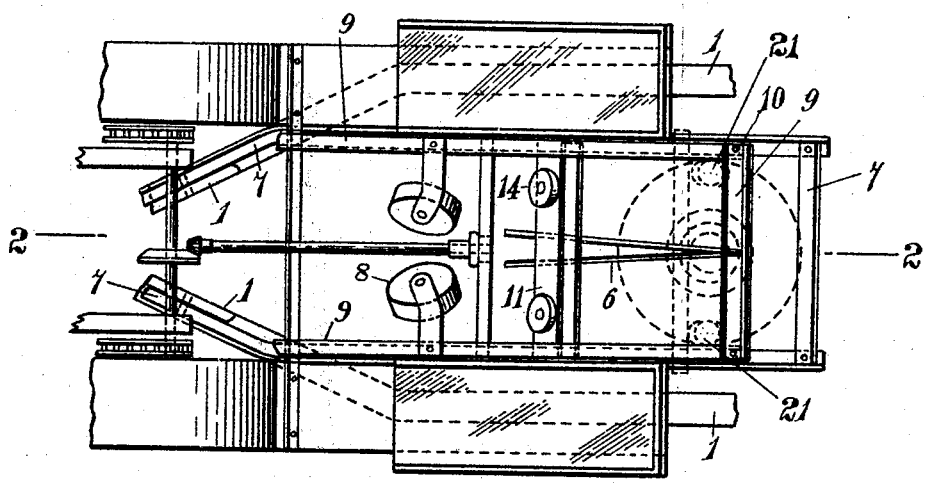

Jan. 6, 1931.  E. LE BOEUF ET AL  1,787,538
FERTILIZER ATTACHMENT FOR PLANTING MACHINES
Filed July 13, 1927  2 Sheets-Sheet 1

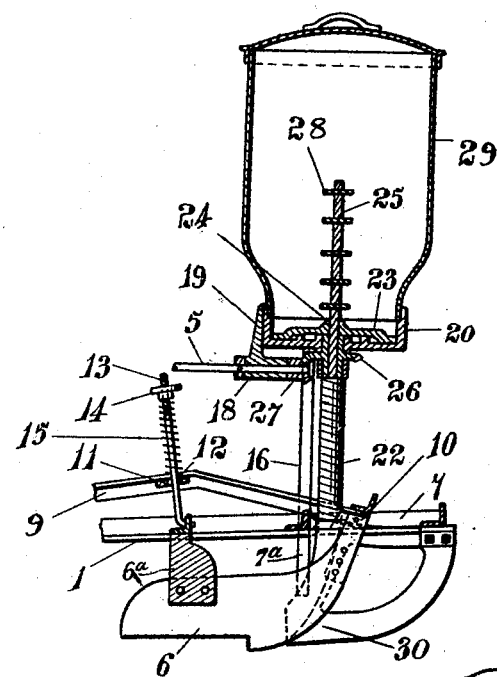
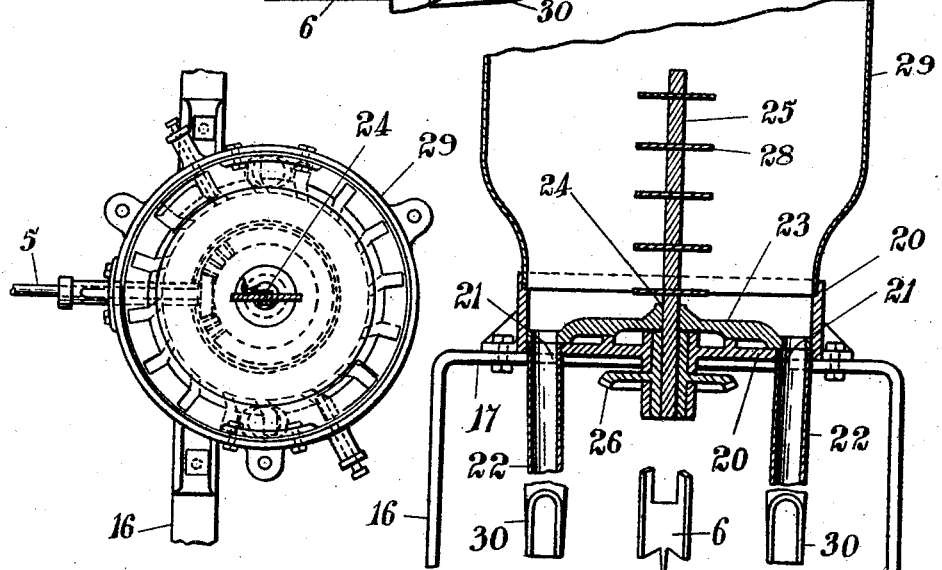

Patented Jan. 6, 1931

1,787,538

UNITED STATES PATENT OFFICE

ELPHEGE LE BOEUF, JOHN AUGUST SMITH, AND JAMES MOSS, OF TILBURY, ONTARIO, CANADA; SAID MOSS ASSIGNOR TO SAID LE BOEUF AND SAID SMITH

FERTILIZER ATTACHMENT FOR PLANTING MACHINES

Application filed July 13, 1927. Serial No. 205,514.

Various kinds of planting machines are used for truck growing, tobacco raising, and nursery purposes, and each of these machines comprises a steel shoe or furrow opener, and pack wheels or press plates for closing the furrow and packing the soil about the roots of the plants. The planting mechanism is usually mounted on a sub-frame and operated by a lever which enables the driver to adjust the furrow opener to enter the soil and cut a trench of any desired depth, and the pack wheels or press plates are mounted on a separate floating frame, adjustable to suit the condition of the soil, and maintained in contact with it by compression springs. Pack wheels are preferably used for loamy soil and run freely over the surface without pushing it in front of them, and press plates are used for very light soil and are adjustable to suit the needs of the planting conditions. The pack wheels or press plates are in rear of the furrow opener and spaced from it for free movement of the hands in setting the plants in the furrow. The depth of the furrow cut by the furrow opener is varied to suit conditions and after proper adjustments have been made the planting depth is maintained throughout so that all the plants are set at the same depth. The placing of the plants in the row is governed by the audible clicking of a set of gears which controls the flow of water and which may be changed to suits the needs of planting. The water is applied with considerable force directly on the roots of the plants, spreading them out in a natural position and settling them into the soil so that every fibre is in contact with the moist earth. Immediately after the water has been applied the pack wheels or press plates close the furrow and pack the soil firmly and evenly about the roots and at the same time pack the dry soil at the surface about the stem of the plants.

Such machines have been provided with a fertilizer distributing attachment comprising a container for holding the fertilizer and a flexible tube for carrying the fertilizer from the container to the ground. The feed of the fertilizer from the container to the tube is assured by an agitator which maintains the fertilizer in a constant state of motion and controlled by a distributor which delivers a fixed or predetermined quantity of the fertilizer to the tube at each revolution of a gate within the distributor. In such machines the fertilizer carried to the ground through the flexible tube has been deposited in a continuous stream in front of the furrow opener which theoretically mixes it with the soil. In practice, however, the fertilizer falls into the furrow, comes into direct contact with the roots, and destroys the plants, or remains unmixed on the surface of the soil to be washed away by the rain or lose its fertilizing value by exposure.

Our present invention relates to an attachment for planting machines which will carry the fertilizer to the ground and deposit it in two continuous drills, one at each side of the furrow with intervening strata of soil between the fertilizer and the plant roots, thereby avoiding any possibility of it coming into contact with them until the fertilizer has been dissolved by the moisture in the soil which dilutes it to a degree that is non-injurious to plant life.

For this purpose the distributor is provided with two diametrically opposite outlets and the sub-frame is provided with two drill shoes, one located at each side of the furrow opener in front of the pack wheels or press plates and these shoes open a drill at each side of the plant furrow. The drill shoes are connected by flexible tubes with the outlets of the distributor, and the fertilizer passes from the outlets through the flexible tubes and the drill shoes to the drills. The pack wheels or press plates close the drills, and the fertilizer is then covered and maintained in the vicinity of the plant roots until such times as it is dissolved by the moisture of the soil. This prevents the fertilizer from coming into direct contact, in a solid form, with the plant roots and also prevents it from being washed away by the rain and from losing its strength by exposure. The drill shoes are so located as to deposit the fertilizer at a higher elevation in the soil than the plant roots and enable them to obtain the full benefit of the stimulating and accelerating effect of the fertilizer as it filters through the soil from the higher to the lower level.

Figure 2:
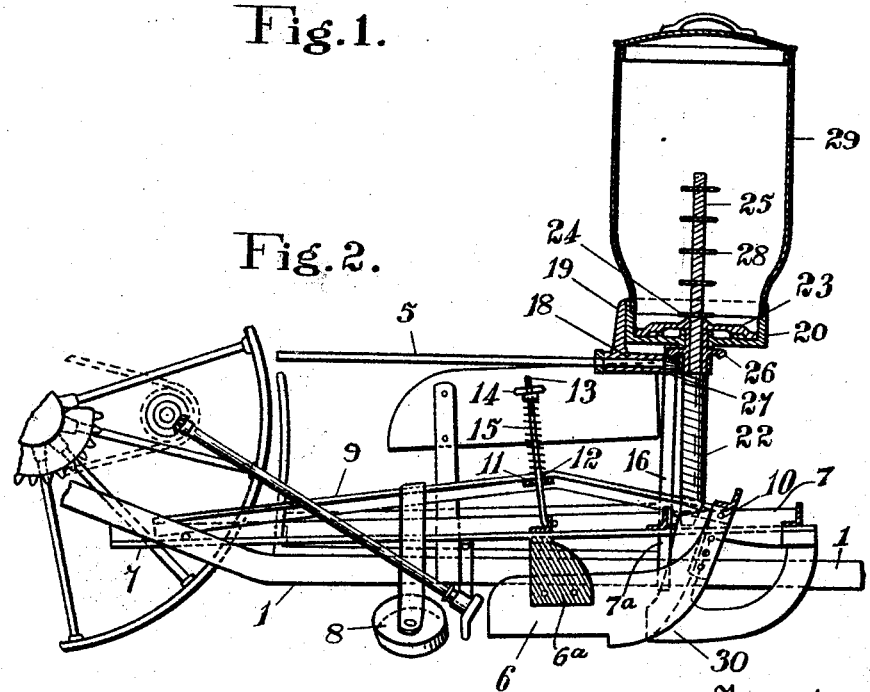

For an understanding of the invention reference is to be had to the following description and to the accompanying drawings, in which:

Fig. 1 is a plan view of a planting machine constructed according to this invention, with the fertilizer distributing attachment removed but showing in dotted lines its location, Fig. 2 is a sectional elevation on the line 2—2 Fig. 1, Fig. 3 is a sectional elevation of the fertilizer distributing attachment, drill opener, and flexible pipe, Fig. 4 is a plan view of the distributor, and Fig. 5 is a cross-section of the distributor through the outlets.

Like numerals of reference refer to like parts throughout the specification and drawings.

Artificial or commercial fertilizer is used to stimulate and force the growth of certain classes of plants particularly in regions where the soil requires heavy fertilization and in other regions where the growing season is relatively short, and our invention relates to an attachment for planting machines which will put the fertilizer into the ground simultaneously with the setting of the plants. Therefore no parts of the machine will be specifically described other than may be required to explain the purpose and operation of our attachment, which is designed to be applied to any standard type of planting apparatus.

The general construction of a planting machine comprises a main frame 1, designed to carry the usual water tank, driver's seat, plant setters' seats, adjustable foot rests, plant boxes, and the other equipment which complete the apparatus. The main frame 1 is supported at the rear by ground wheels and the outlet valve for the water tank is controlled by gears rotated by and during the revolution of the ground wheels. The planting mechanism comprises a sub-frame 7 which can be operated by the usual levers for lowering the furrow opener into the soil when the furrow is started and for raising it from the ground when the end of the furrow is reached. This sub-frame 7 is supported from the main frame 1 by brackets 7a and carries a steel shoe or furrow opener 6, drill shoes 30, and floating frame 9, for the pack wheels or press plates 8, the furrow opener being bolted to a bracket 6a secured to the sub-frame. The depth of the furrow cut by the shoe or furrow opener may be varied to suit conditions by the adjustment of the sub-frame and after the proper adjustment has been made the planting depth is maintained throughout so that all the plants are set at the same depth. The plants are manually set in the row and the spacing of the plants is governed by the gears which control the flow of water and which may be changed to suit the needs of the planting, the time for setting a plant being indicated by the audible clicking of the gears or by the flow of water and the quantity of water being regulated by means of a valve which is operated by a conveniently placed lever near the driver's foot.

The steel shoe 6 opens the furrow, a plant is set in it at each clicking of the gears, and the water, applied with considerable force directly on its roots, spreads them out in a natural position and settles them into the soil. Immediately after the water has been applied the pack wheels or press plates 8, close the furrow, pack the soil firmly and evenly about the roots and press the dry soil at the surface about the stem of the plant. The pack wheels or press plates are mounted in the floating frame 9 and this frame is connected with the sub-frame 7 by a fulcrum 10 on which it rocks for the pack wheels or press plates to adapt themselves to the surface of the soil. To maintain a pressure of the pack wheels or press plates on the ground, the floating frame is provided with a cross bar 11 and this cross bar is formed with two slots 12, one adjacent to each side of the frame. A rod 13 is entered through each slot and these rods are connected at their lower ends to the sub-frame 7. The upper end of each rod 13 is screw-threaded and is provided with an adjustable nut 14, and encircling each rod between the cross bar 11 and its respective nut 14 is a compression spring 15 tensioned by the adjustment of the nut and these springs, by their engagement with the nut 14 and cross bar 11, exert pressure upon the floating frame and maintain the pack wheels or press plates under pressure in contact with the soil.

Bolted or otherwise rigidly secured to each side of the sub-frame 7 is a standard 16 which extends above the level of the plant boxes and connecting the tops of the standards 16 is a cross bar 17 provided with a bearing 18 in which is journalled one end of the gear shaft 5. This bearing 18 has an upwardly extending flange 19 to which is secured the pan 20 of the distributor. The bottom of the pan is formed with two diametrically opposite outlets 21 adjacent to its perimeter and arranged one at each side of the longitudinal axis of the machine, and connected to each outlet 21 is the upper end of a flexible tube 22. Within the pan 20 and in contact with its bottom is a rotatable gate 23 which during its rotation conveys the fertilizer around the bottom of the pan and positively delivers it to the outlets 21. The gate is formed with a central aperture 24, which as shown in Fig. 4, is of a multilateral shape in plan. Entered through the aperture 24 is the agitator shaft 25 of corresponding shape and dimensions to the aperture. The lower end of the agitator shaft is provided with a gear wheel 26 which meshes with a gear wheel 27 on the gear shaft 5. The shaft 5 is driven from the ground wheels and its rotation causes the gear wheel 27 to rotate the gear wheel 26 and agitator shaft 25. The agitator shaft 25, above the gate 23, is provided with a plurality of agitator arms 28. A bottomless container or tank 29 is seated on and secured to the pan 20 and the fertilizer is placed in it. The agitator shaft 25 rotates the gate and arms within the tank and keeps the contents in a state of motion which assures the fertilizer descending to the bottom of the pan to be engaged by the gate and carried during its rotation to the outlets.

Two drill shoes 30 are bolted or otherwise rigidly secured to the sub-frame 7 in advance of the furrow opener, one shoe being located at each side of, and laterally spaced from it. Entered in the top of each drill shoe is one of the flexible tubes 22 through which there is a continuous flow of the fertilizer from the tank to the drill shoes. The sole of each drill shoe is above the level of the sole of the furrow opener, so that the bottom of the drill will be above the bottom of the furrow. The drill shoes are spaced laterally from the furrow opener and leave a body of soil between each drill and the furrow, so that the fertilizer deposited in the drill will not come into direct contact with the plant roots until it has been dissolved by the moisture in the soil. By arranging the bottom of the drill at a higher elevation than the bottom of the furrow, the plant roots will be stimulated and the growth of the plant will be accelerated by the dissolved fertilizer as it seeps through the soil to the lower elevation. The furrow opener is of a substantially wedge shape and its heel is of a width which will provide sufficient planting space in the furrow for the setting of the plants, and the spreading of the roots. The furrow opener can be adjusted to cut a trench of any desired depth, usually two to five inches, and the drill shoes for the fertilizer are correspondingly adjusted as both the furrow opener and the drill shoes are attached to the sub-frame which is operated by a lever convenient to the driver's seat.

By this attachment the fertilizer can be placed in the soil at the sides of the furrow and protected from exposure either to the roots, sun or atmosphere. Consequently it cannot deteriorate or be washed away by the rain, and cannot come into direct contact with the plant roots until dissolved by moisture in the soil, and when dissolved it is diluted to a degree that is not injurious to the plants.

Having thus fully described our invention what we claim as new and desire to secure by Letters Patent is:

A planting machine comprising a main frame, a sub-frame supported from the main frame, and a floating frame rockably connected with the sub-frame, a furrow opener carried by the sub-frame, two drill shoes secured to the sub-frame in advance of the furrow opener and located one at each side of and laterally spaced from it, a fertilizer container carried by the sub-frame, a flexible tube entered in each drill shoe for the flow of the fertilizer from the container to said shoes, and means secured to the floating frame in rear of the furrow opener for closing the furrow.

Dated at the town of Tilbury, in the county of Kent and Province of Ontario, Dominion of Canada, this 28th day of May, 1927.

ELPHEGE LE BOEUF.
JOHN AUGUST SMITH.
JAMES MOSS.